April 19, 1949. M. P. WINTHER Re. 23,101

UNIVERSAL ANGLE DRIVE

Original Filed Nov. 14, 1946

Martin P. Winther
Inventor.
Haynes and Koenig
Attorneys.

Reissued Apr. 19, 1949

Re. 23,101

UNITED STATES PATENT OFFICE 23,101

UNIVERSAL ANGLE DRIVE

Martin P. Winther, Gates Mills, Ohio, assignor to Martin P. Winther, Waukegan, Ill., trustee Original No. 2,454,111, dated November 16, 1948, Serial No. 709,837, November 14, 1946. Application for reissue February 11, 1949, Serial No. 75,932

4 Claims. (Cl. 172—284)

This invention relates to a universal angle drive, and with regard to certain more specific features, to a drive of this class having a constant angular velocity ratio at all drive angles.

Among the several objects of the invention may be noted the provision of a drive or coupling for connecting driving and driven elements at any of various angles; the provision of a drive of the class described which provides an adjustable shock-proof electric slip coupling between the driving and driven elements; the provision of a drive of the class described in which constant angular velocity ratio between the driving and driven elements may be obtained at any of the angles within its range and under all slip speeds; and the provision of a drive of this class which is simple and economical to construct for a long life with little wear under adverse operating conditions. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is a horizontal section of the device viewed in plan, the section being taken on line 1—1 of Fig. 2;

Similar reference characters indicate corresponding parts throughout the several views of the drawings.

Figure 1:
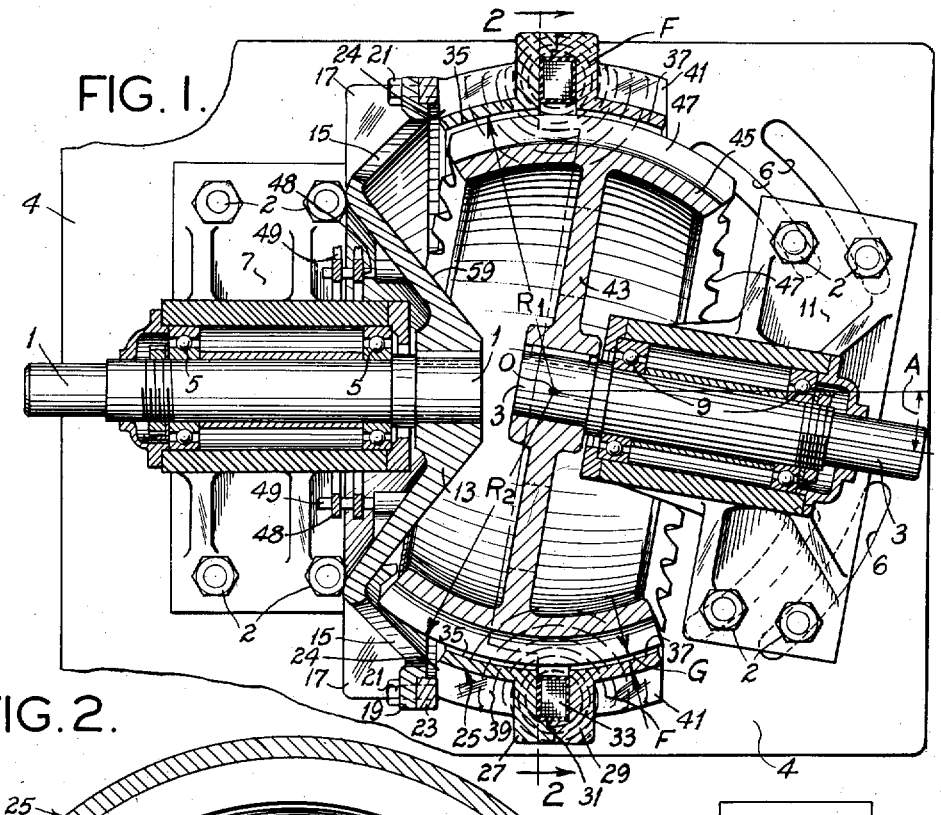

There are in existence various mechanical types of universal drives or couplings, some of which do not provide a constant angular velocity ratio between the driving and the driven members, and some of which do. An example of the former is the so-called Hooke or Cardan universal joint. An example of the latter is, for example, the so-called Weiss coupling. There are others in each category, but they all have the common disadvantage that either the constant angular velocity ratio is not obtained or complex means must be used to obtain it, if sufficient strength is to inhere. None of them which have any reasonable shaft angle adjustment are sufficiently shock-proof, and even those that are shock-proof employ resilient members that tear or lose their resiliency. Furthermore, none of them provides for any so-called slip-coupling effect whereby the desired velocity ratio may be adjusted to provide a range of selective speeds of the driven member. That is to say, none of them provides for a selective speed reduction through the coupling with a constant angular velocity ratio at any selected reduction.

The present invention provides not only a strong and simple universal coupling which is effective over a wide range of angles between the driving and driven elements, but provides an adjustable slip-coupling speed-reducing action with the facility to maintain a constant angular velocity ratio at any selected speed reduction.

Referring now more particularly to the drawings, there is shown a drive shaft at numeral 1 and a driven shaft at numeral 3. The drive shaft 1 is carried upon bearings 5 in a pedestal 7. The driven shaft 3 is carried in bearings 9 in a pedestal 11.

Keyed to the right-hand end of the shaft 1 is a spider 13 which is rotary with the shaft 1. This spider includes suitable ventilating openings 15 and fins 17 for inducing air circulation through the openings. A continuous rim of the spider is shown at 19. Bolted to the rim 19 (see bolts 21), is a rim 23 of a female magnetic inductor member indicated generally by numeral 25. This inductor member is magnetic and conductive, being composed, for example, of magnetic iron or steel, in which eddy currents may flow. It is made in two halves 27 and 29 which are bolted together at a grooved joint 31. The two halves hold between them in the grooves an annular excitation coil 33. The inner surfaces of the members 27 and 29 are concentrically spherically formed, as indicated at numerals 35 and 37, the formative sphere having a center at O, the two spherical surfaces 35 and 37 having a common radius $R_1$. The two surfaces 35 and 37 may be considered to constitute an interior substantially uninterrupted female spherical inductive surface of the member 25. Behind these surfaces 35 and 37 are formed integral fins 39 and 41. The fins 39 being also integral with the attachment ring 23 serve with said ring 23 to organize the spherical inductor 25 upon the rotary spider 13. Openings at 24 accommodate outward air flow.

Figure 2:
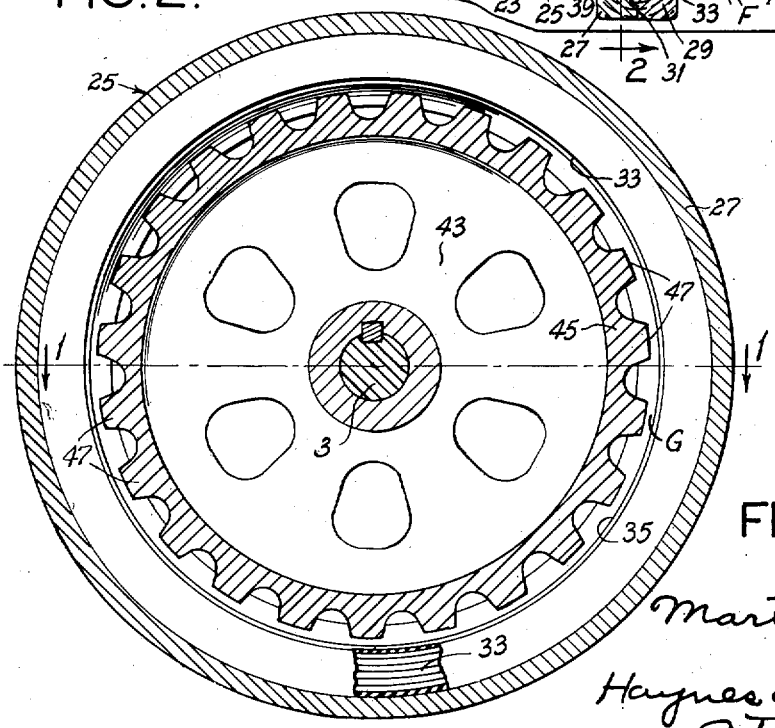
Fig. 2 is an ideal cross section taken on line 2—2 of Fig. 1.

Keyed to the driven shaft 3 is a second spider 43, which has a spherically formed rim 45 upon which are located arcuate teeth 47. The arcs of the respective teeth preferably extend along great circles of the sphere in planes which include the axis of shaft 3. They may therefore be said to constitute protuberances of lunate form. The rim 45 and teeth 47 are also magnetic. The teeth 47, in cross section, are of tapered form, as shown in Fig. 2, and as shown in Fig. 1 have radii of curvatures of their outer edges as indicated at $R_2$. This radius $R_2$ is shorter than the radius $R_1$ by the amount indicated at G, which represents an air gap between the curved ends of the teeth and the inner inductor surfaces 35 and 37. This gap is constant throughout its entire area by reason of the fact that the center of radius $R_2$ is coincident at O with the center of radius $R_1$ (see Fig. 1). The organization 43, 45, 47 may be referred to as a spherical male member.

If the annular field coil 33 is energized with current (preferably direct current) there will be generated a toric flux field, the cross section of which is generally indicated by dash lines F around coil 33 in Fig. 1. This toric flux field interlinks the magnetic material of the inductor 25 with the magnetic material of the sphere 45 and its teeth or interruptions 47. The teeth 47 thus function as flux-concentrating poles which concentrate areas of flux. These cencentrated flux areas intersect the spherical inner inductive face of the member 25. The result will be that under any relative movements between the members 25 and 45 the flux concentrations will move relatively to the inner spherical inductor surfaces 35 and 37, thereby inducing eddy currents therein which produce a magnetic field which is reactive to the magnetic fields issuing from the teeth 47. These reactive fields cause an electric slip coupling between the members 25 and 43. This accomplishes the rotative coupling between the angled shafts 1 and 3.

Figure 3:
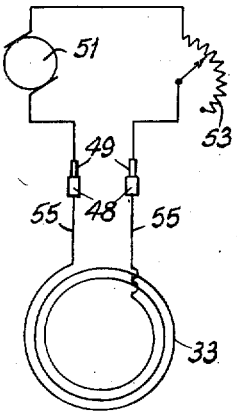
Fig. 3 is a schematic wiring diagram.

Current for exciting the annular coil 33 is brought onto the inductor 25 by means of suitable brushes 49 contacting with insulated slip rings shown at 48. These are in an exciting circuit (Fig. 3) including a source of current 51 and a rheostat or equivalent control 53 for controlling the excitation of coil 33. The wires for connecting the slip rings 48 with the coil 33 are shown diagrammatically at 55.

In Fig. 1 the pedestals 7 and 11 are shown positioned to hold the shafts 1 and 3 at a predetermined angle between them, having its apex at O. It will be understood that the members upon which the pedestals 7 and 11 are located may be angled relatively to provide any other angle of drive within the range of the device, including zero angle. The maximum angle A is substantial and in the present embodiment is of the order of 10°. As shown in Fig. 1, bolts 2 are used for holding the pedestals on a support 4. The bolts 2 associated with pedestal 11 cooperate with arcuate slots 6 in the frame 4. The slots are centered on point O. Hence the angle A may be readily adjusted. It will be understood that the chosen angle need not lie in the plane of the paper as shown, but that it may be in any plane. In other words, the spherical spacing of the members 25 and 43, through the spherical air gap G will accommodate an indefinite number of angles in any plane between the shafts 1 and 3.

Operation is as follows:

When the coil 33 is energized, the toric flux field F interlinks the inductive surfaces 35, 37 and the teeth 47. Then upon rotating the drive shaft 1, the driven shaft 3 will be driven by electromagnetic reaction with a certain amount of angular slip, depending upon the excitation of the coil 33. The slip is small at full excitation and may be increased as desired by reducing the excitation. However, regardless of the amount of slip selected, the angular velocity ratio between the shafts 1 and 3 is constant for a given slip.

Any heat generated at the eddy-current surfaces 35 and 37 in the inductor member 25 is dissipated by air flow engendered by the fins 17, 39 and 41. Air circulation may take place through the spaces between teeth 47, in the air gap G and through the openings 15 and 24.

It will be observed that the maximum angle A at which the drive will operate is conditioned in part by the inner form of the spider 13 which in the present example is arranged with a cone as shown at 59. This form makes a compact design because it allows of placing the inner end of shaft 1 close to center O. It will of course be observed that if it is not desired to place the shaft 1 in close to the spherical members, this conical form may be dispensed with.

It is to be observed that the following changes in relationships would constitute mere mechanical and electrical inversions under the principles described in this disclosure:

The shaft 3 may be made the drive shaft and the shaft 1 the driven shaft. The relatively uninterrupted or smooth spherical inductor surface may be on the inner spherical male member and the toothed polar member may be the outer female member with teeth extending inwardly. Also, the annular field coil 33 may be carried in a mid plane either on the outer female member as shown, or upon the inner male member, regardless of whether the respective member plays the role of polar member, or inductor.

It is also to be observed that although only one coil 33 is shown, several might be used if desired.

Since there is no rigid mechanical connection between the members 25 and 43, but only a resilient magnetic connection, no shock is transmitted. Furthermore, since the only connection is at gap G, there is no wear due to the universal coupling elements per se, regardless of the angle between the driving and the driven shafts. No lubrication is required at the driving surfaces per se, and the action is very quiet. In mechanical universal couplings the wear and noise increases severely with increase in angle between shafts. The present invention avoids this trouble.

It will be noted from Fig. 1 that the spherical extents of the spherical forms of the inductor surfaces 35, 37 and of the teeth 47 in the directions of their meridians are such that the complete interlinkage of the toric flux field F. is substantially constant under any adjustments of the driving and driven axes. This results in maintaining the maximum possible torque transmission at a given adjusted shaft angle.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A constant velocity-ratio universal coupling for effecting a substantially angled mechanical drive comprising male and female driving and driven members rotary on angled axes having an intersecting point, one of said members having flux-concentrating polar members the outer peripheries of which are defined spherically with a center substantially at said point, the other member having an adjacent relatively uninterrupted inductor surface also defined spherically with a center substantially at said point, the resulting spherically defined polar peripheries of the flux-concentrating polar members and said spherically defined inductor surface being spaced by means of a constant spherical air gap irrespective of the angle of said axes, and at least one annular excitation coil carried on one of said members in a plane substantially perpendicular to its axes of rotation and generating a toric flux field interlinking both of said members and passing through said polar members and through said inductor surface, the inductor surface and the polar members being magnetic.

2. A constant velocity-ratio universal coupling for effecting a substantially angled mechanical drive comprising male and female driving and driven members rotary on angled axes having an intersecting point, one of said members having flux-concentrating polar members the outer peripheries of which are defined spherically with a center substantially at said point, the other member having an adjacent relatively uninterrupted inductor surface also defined spherically with a center substantially at said point, the resulting spherically defined polar peripheries of the flux-concentrating polar members and said spherically defined inductor surface being spaced by means of a constant spherical air gap irrespective of the angle of said axes, and at least one annular excitation coil carried on one of said members in a plane substantially perpendicular to its axes of rotation and generating a toric flux field interlinking both of said members and passing through said polar members and through said inductor surface, the inductor surface and the polar members being magnetic, and means for substantially adjustably maintaining said axes for intersection at said point, the spherical extents of said inductor surface and of said polar members in the directions of their meridians being such that interlinking of the toric flux field with both of said members is substantially uninterrupted over the available range of angular adjustments of said axes.

3. A constant velocity-ratio universal coupling for effecting a substantially angled mechanical drive comprising male and female driving and driven members rotary on angled axes having an intersecting point, one of said members having flux-concentrating polar members the outer peripheries of which are defined spherically with a center substantially at said point, the other member having an adjacent relatively uninterrupted inductor surface also defined spherically with a center substantially at said point, the resulting spherically defined polar peripheries of the flux-concentrating polar members and said spherically defined inductor surface being spaced by means of a constant spherical air gap irrespective of the angle of said axes, at least one annular excitation coil carried on one of said members in a plane substantially perpendicular to its axes of rotation and generating a toric flux field interlinking both of said members and passing through said polar members and through said inductor surface, the inductor surface and the polar members being magnetic, and means for variably exciting said field coil.

4. A constant velocity-ratio universal coupling for effecting a substantially angled mechanical drive comprising male and female driving and driven members rotary on angled axes having an intersecting point, one of said members having flux-concentrating polar members the outer peripheries of which are defined spherically with a center substantially at said point, the other member having an adjacent relatively uninterrupted inductor surface also defined spherically with a center substantially at said point, the resulting spherically defined polar peripheries of the flux-concentrating polar members and said spherically defined inductor surface being spaced by means of a constant spherical air gap irrespective of the angle of said axes, at least one annular excitation coil carried on one of said members in a plane substantially perpendicular to its axes of rotation and generating a toric flux field interlinking both of said members and passing through said polar members and through said inductor surface, the inductor surface and the polar members being magnetic, means for variably exciting said field coil, and means for adjustably maintaining said axes for intersection at said point, the spherical extents of said inductor surface of said polar members in the directions of their meridians being such that interlinking of the toric flux field with both of said members is substantially uninterrupted over the available range of adjustments of said axes.

MARTIN P. WINTHER.

No references cited.